United States Patent

Jorritsma

[11] Patent Number: 5,497,664
[45] Date of Patent: Mar. 12, 1996

[54] METHOD AND APPARATUS FOR CALCULATING FLOW RATES THROUGH A PUMPING STATION

[76] Inventor: Johannes N. Jorritsma, 15297-6 Yonge Street, Aurora, Ontario, Canada, L4G 1N6

[21] Appl. No.: 339,746

[22] Filed: Nov. 14, 1994

[51] Int. Cl.⁶ .................................................... G01F 1/00
[52] U.S. Cl. .............................................................. 73/861
[58] Field of Search ................................................ 73/861

[56] References Cited

U.S. PATENT DOCUMENTS

| | | |
|---|---|---|
| 2,101,257 | 12/1937 | Vogel-Jorgensen . |
| 2,382,951 | 1/1946 | Salisbury . |
| 4,455,870 | 6/1984 | Jorritsma . |
| 4,669,308 | 6/1987 | Jorritsma . |
| 5,003,489 | 3/1991 | Wildberger ........................... 73/861 |
| 5,182,951 | 2/1993 | Jorritsma ............................. 73/861 |
| 5,190,442 | 3/1993 | Jorritsma ............................. 417/7 |
| 5,385,056 | 1/1995 | Marsh et al. ......................... 73/861 |
| 5,421,208 | 6/1995 | Packard et al. ..................... 73/861 |

*Primary Examiner*—Richard Chilcot
*Assistant Examiner*—Jewel V. Artis
*Attorney, Agent, or Firm*—Shoemaker and Mattare, Ltd.

[57] ABSTRACT

A method and apparatus for determining liquid flow through a system including a container from which liquid is pumped out by one or more pumps, the pumping rate for all combinations of pumps being known and stored in a memory. When pumping is off, the liquid surface rises from a lower to an upper limit level. When the surface reaches the upper limit level, the pumping phase begins. When the surface reaches the lower level, the pumping is stopped and the cycle is repeated. If only one pump is required, the inflow rates prior to and just after the pump cycle are averaged. This average flow rate is multiplied by the pump time and added to the totalizer. Then the container volume is also added, following which the outflow rate (pump rate) is calculated by using the previously established average inflow rate (total volume divided by pumptime plus the average inflow rate). This value can be stored in the addressable memory.

If a plurality of pumps is required to make the liquid level drop, the liquid volume pumped during the pumping phase is calculated from information in the memory to determine the stored volume pumping rate for the particular operating pumps, and multiplying such stored rate by the duration of the pumping phase. The result is then added to the totalizer.

7 Claims, 2 Drawing Sheets

METHOD AND APPARATUS FOR CALCULATING FLOW RATES THROUGH A PUMPING STATION

This invention relates generally to a method and apparatus for determining a reliable measurement of the flow of liquid through a system, for example a sewage system.

BACKGROUND OF THIS INVENTION

Among the prior patents, two may be singled out, these being U.S. Pat. No. 2,101,257, issued Dec. 7, 1937 to M. Vogel-Jorgensen, for "Apparatus for Measuring Liquid or Fluent Materials", and U.S. Pat. No. 2,392,951, issued Jan. 14, 1946 to R. G. Salisbury, and entitled "Flow Meter". In the case of both of these patents, the concept is to provide a calibrated volume which may be switched into and out of the normal flow line for the liquid, allowing the flow rate to be monitored at timed intervals. A drawback of these prior art patents is that the calibrated volumes provide only an approximate idea of the total flow, and are incapable of exact precision.

My own earlier U.S. Pat. No. 4,455,870, issued Jun. 26, 1984 and entitled "Method and Apparatus for Determining Liquid Flow Rates" attempts to solve the problems inherent in the prior art mentioned above. My prior patent provides a method for determining the total inflow of a liquid through a liquid-flow system in which the liquid enters a sump cavity and is pumped out of the sump cavity by pump means. A computer calculates an on-going total inflow volume for the liquid by (1) adding in the sump cavity volume between lower and upper limit levels each time the liquid surface rises to the upper limit level, and (2) determining the inflow rate over the last portion of the filling time just described and extrapolating this inflow rate over the time during which the pump means is operating, to yield an incremental quantity, such quantity being added into the ongoing total inflow volume.

The said earlier patent provided a satisfactory procedure for determining total inflow volume in a relatively reliable way, but in certain cases it was not as accurate as desired, especially when the inflow rate was changing more or less dramatically during the pumping cycle.

The latter problem was addressed by my U.S. Pat. No. 4,669,308, issued Jun. 2, 1987, and entitled "Method and Apparatus for Determining Liquid Flow Rates". In this second patent, improved accuracy was obtained, but at the cost of requiring a significantly more complex apparatus. In brief, the solution offered by the latter patent was to calculate an inflow rate during a pumping phase by determining the inflow rate during two sequential intervals just prior to the pumping phase, and over two sequential intervals just after the pumping phase. For each pair of intervals, the flow rates were extrapolated either forward or backward (as the case may be) for the pumping phase in question, and the two extrapolated values were averaged before being multiplied by the duration of the pumping phase in order to arrive at a total volume entering during the pumping phase.

My further prior U.S. Pat. No. 5,182,951, issued Feb. 2, 1993, and entitled "Method and Apparatus for Calculating Flow Rates Through a Pumping Station" uses a different approach to calculating total flow volume. The apparatus includes at least one pump, and also includes, for each pump and for each combination of pumps, an oscillator circuit of which the output frequency can be adjusted. The frequency of each such circuit is adjusted to represent the pump rate for the pump or combination of pumps to which that oscillator circuit corresponds. While operating the pumping station, a totalizer has fed to it the output frequency of that oscillator circuit which corresponds to the pump or combination of pumps that is operating in any given time, and the total in the totalizer is incremented by a given amount for each pulse encountered, thus continuously updating the totalizer.

My further U.S. Pat. No. 5,190,442, issued Mar. 2, 1993, and entitled "Electronic Pumpcontrol System", is an attempt to achieve greater sophistication and accuracy in a system incorporating a plurality of pumps which can be operated individually or in various combinations. In view of the fact that most pumps produce a flow rate which varies depending upon backpressure, the inventive combination set forth in my latter patent senses backpressure and includes an addressable memory for storing pumping rate values vs. backpressure for each of the pumps. A processor is programmed such that, on high backpressure, the pump controller avoids pump starts that will not result in a net increase in the total pumping rate, whereas on a decrease in backpressure, the pump controller allows more pumps to start when called for, and allows for the starting of more pumps than the minimum necessary, in order to decrease the duration of pumping. The pump controller avoids a pump start under conditions which would result in the pump undergoing rapid on/off cycling, and further the pump controller avoids starting and stopping the pumps on pressure surges.

Summarizing the prior art, it can be said that total liquid flow determination can be relatively accurately determined, but the accuracy comes at a substantial cost due to complexity. By contrast, the simpler arrangements generally fail to provide the kind of accuracy that is expected from a monitoring system of this kind.

GENERAL DESCRIPTION OF THIS INVENTION

In view of the drawbacks of the prior art, as set forth in the previous section, it is an object of one aspect of this invention to provide a method and apparatus for calculating flow rates through a pumping station which achieve very respectable accuracy at a relatively low cost.

More particularly, this invention provides a method for determining the total flow of a liquid through a liquid-flow system in which the liquid enters a container and is pumped out of the container by pump means which includes at least two pumps that may operate independently or together, the volume pumping rate for at least each combination of pumps being known and stored in an addressable memory, the method comprising the steps:

(a) allowing the liquid surface in the container to rise between a predetermined lower limit level and a predetermined upper limit level while the pump means is shut off, (b) detecting the arrival of the liquid surface at a predetermined intermediate level as it rises between the lower limit level and the upper limit level, the liquid volume between the lower and the intermediate levels being substantially the same as the liquid volume between the intermediate and the upper levels, (c) detecting the arrival of the liquid surface at the upper limit level, and upon such arrival, signalling the pump means to begin the pumping phase utilizing at least one pump selected by the pump controller, sufficient to remove liquid from the container faster than the inflow rate.

(d) detecting the arrival of the liquid surface at the lower limit level, and upon such arrival, signalling the pump means to stop the pumping phase, (e) again allowing the liquid surface to rise as in step (a) and repeating steps (b), (c) and (d) in sequence, and (f) calculating an on-going total inflow volume for the liquid by:

(1) if only one pump is required under (c), calculating the inflow rate during the pumping phase by averaging the inflow rate between the intermediate and upper levels just prior to the pumping phase and the inflow rate between the lower and intermediate levels just after the pumping phase, multiplying such calculated inflow rate by the duration of the pumping phase to arrive at a volume of liquid entering during the pumping phase, and adding in said volume; then adding in the container volume; then calculating the outflow rate (pump rate) by using the previously established average inflow rate (total volume divided by pumptime plus the average inflow rate), then storing this value in the addressable memory.

(2) or, if a plurality of pumps is required under (c), calculating the liquid volume pumped during the pumping phase by consulting said addressable memory to determine the stored volume pumping rate for the particular plurality of pumps that is operating, multiplying such stored volume pumping rate by the duration of the pumping phase to arrive at a composite volume of liquid equalling the sum of the container volume and the liquid entering during the pumping phase, and adding in said composite volume.

Further, this invention provides an apparatus for determining the total flow of a liquid through a liquid-flow system which includes a container for receiving the liquid and pumping means by which the liquid is pumped out of the container during a pumping phase, the pumping means including at least two pumps and a control means adapted to operate the pumps independently or together, and an addressable memory in which the volume pumping rate for at least each combination of pumps is stored, the apparatus comprising:

(a) first means for detecting the arrival of the liquid surface at a predetermined lower limit level as it drops during a pumping phase, and for generating a signal which turns off said pumping means, (b) second means for detecting the arrival of the liquid surface at a predetermined intermediate level as it rises from the lower limit level, while the pumping means is off, (c) third means for detecting the arrival of the liquid surface at an upper limit level and for generating a signal which turns on said pumping means utilizing at least one pump sufficient to remove liquid from the container faster than the inflow rate, the liquid volume between the lower and the intermediate levels being substantially the same as the liquid volume between the intermediate and the upper levels, whereby the liquid surface continuously rises and falls between said upper and lower limit levels, and (d) computing means for calculating an on-going total inflow volume for the liquid by:

(1) if only one pump is required under (c), calculating the inflow rate during the pumping phase by averaging the inflow rate between the intermediate and upper levels just prior to the pumping phase and the inflow rate between the lower and intermediate levels just after the pumping phase, multiplying such calculated inflow rate by the duration of the pumping phase to arrive at a further volume of liquid entering during the pumping phase, and adding in said further volume; then adding in the container volume; then calculating the outflow rate (pump rate) by using the previously established average inflow rate (total volume divided by pumptime plus the average inflow rate), then storing this value in the addressable memory.

(2) or, if a plurality of pumps is required under (c), calculating the liquid volume pumped during the pumping phase by consulting said addressable memory to determine the stored volume pumping rate for the particular plurality of pumps that is operating, multiplying such stored volume pumping rate by the duration of the pumping phase to arrive at a composite volume of liquid equalling the sum of the container volume and the liquid entering during the pumping phase, and adding in said composite volume.

GENERAL DESCRIPTION OF THE DRAWINGS

One embodiment of this invention is illustrated in the accompanying drawings, in which like numerals denote like parts throughout the several views, and in which:

FIG. 1 is a somewhat schematic, vertical sectional view through a sewage pumping station incorporating the present invention; and FIG. 2 is a graphical illustration for the purpose of explaining the calculation steps involved in a portion of the method of this invention.

DETAILED DESCRIPTION OF THE DRAWINGS

Figure 1:
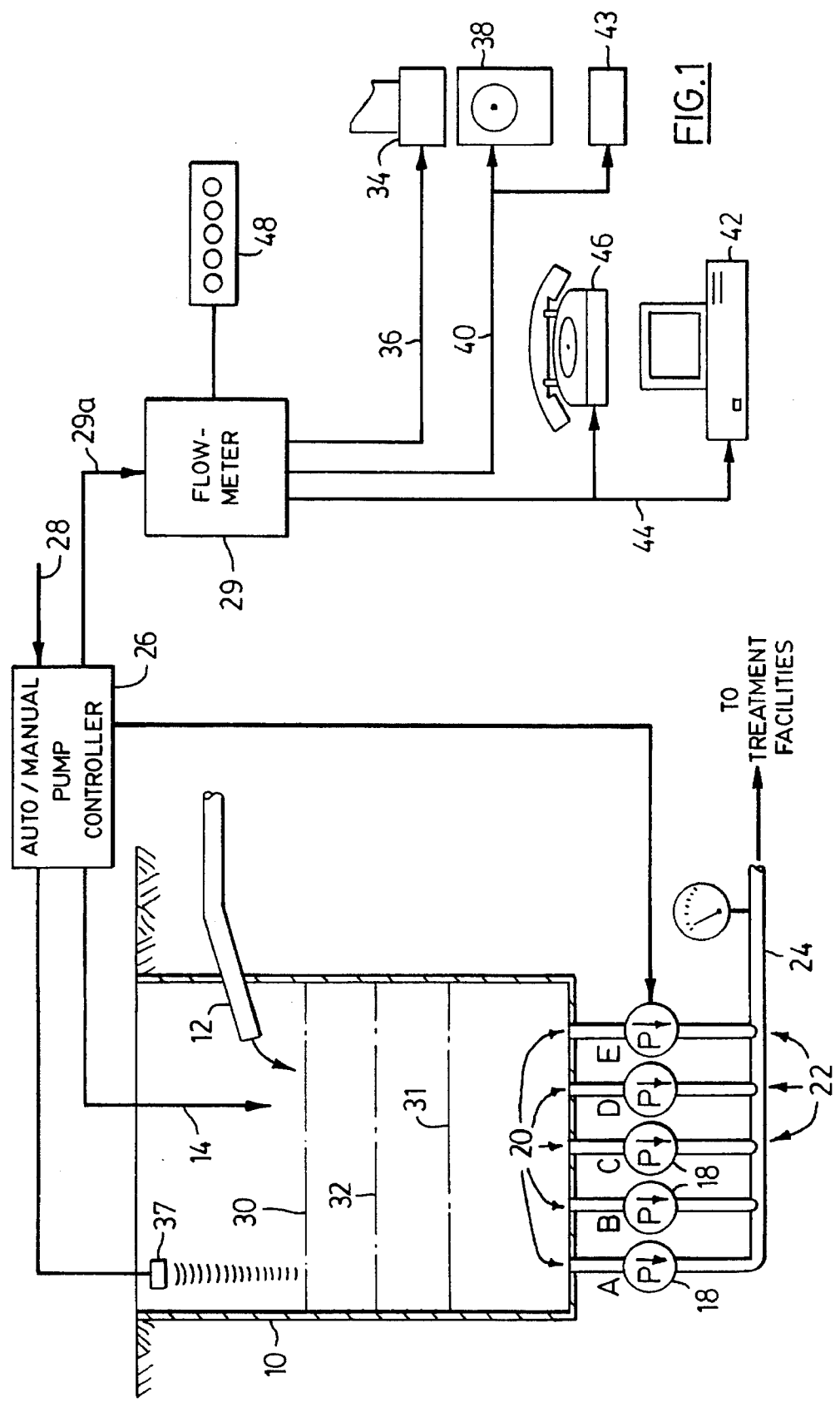

Attention is first directed to FIG. 1, which shows a container 10 for liquid (for example, a wetwell in a sewage system), and an inlet pipe 12 for the inflow of liquid entering the container 10. Means are provided for ascertaining the liquid level in the container 10 and for generating various signals as determined by the liquid level. The means for ascertaining the liquid level is represented in FIG. 1 by the vertically downward arrow 14 and various horizontal lines within the container 10, later to be described.

Also provided in FIG. 1 is a plurality of pumps 18, each having an inlet 20 communicating with the interior of the container 10, and each having an outlet 22 communicating with a common conduit 24 for liquid being pump out of the container 10.

FIG. 1 further shows a pump controller 26 for receiving signals along the sensor line 14, and for starting and stopping the pumps 18. The pump controller 26 may include a manual override control (not illustrated), and receives electric power along line 28.

Looking at the left in FIG. 1, it will be seen that, within container 10, there are defined an upper limit level 30, a lower limit level 31, and an intermediate level 32 which is located such that the liquid volume between levels 31 and 32 is substantially the same as the liquid volume between the levels 32 and 30.

Figure 2:
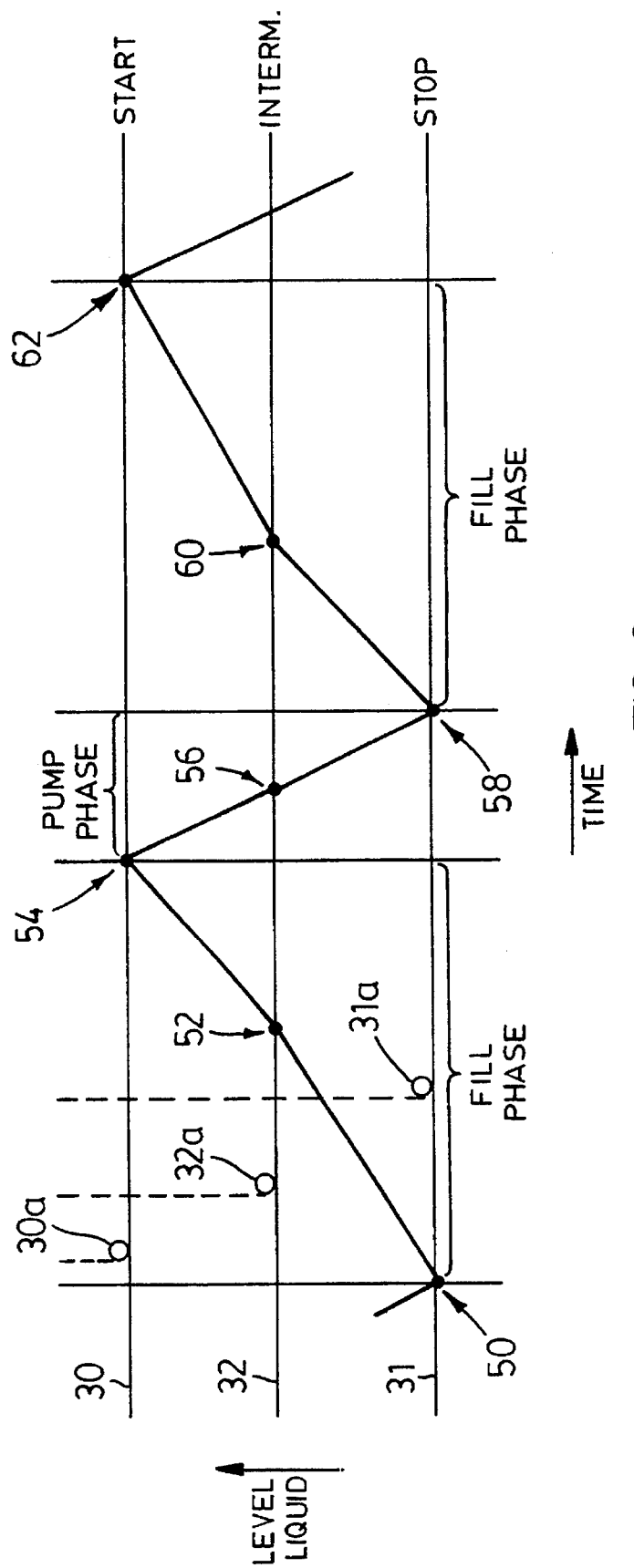

These lines are also represented in FIG. 2, which is a graphical representation with height along the vertical and time along the horizontal. Also shown in FIG. 2, in a schematic way, are sensors 30*a*, 31*a* and 32*a*, which may be float switches or other equivalent devices.

Ultrasonic measuring means, represented in FIG. 1 at the numeral 37, may be utilized in place of the sensors 30*a*, 31*a* and 32*a*, or together with the sensors.

A flowmeter 29 receives information along the line 29*a* from the pump controller 26, and performs the necessary computations.

To the right in FIG. 1 is shown a digital reporting facility 34 operated by the flowmeter 29 along the line 36, and an analog recording modality 38 controlled by the flowmeter 29 along the line 40. Remote computer 42 interacts with the flowmeter 29 along the line 44, and is adapted to provide commands to and obtain information from the flowmeter 29. Box 43 represents an optional flow-proportional feed-pump for delivering an additive such as alum (causes clumping) to the container 10.

The flowmeter 29 operates on a program which includes a "totalizer" function, so that, at any given time, a total cumulative flow, as from a given point in time, can be displayed. The flowmeter 29 also includes an addressable memory in which the volume pumping rate for all possible combinations of two or more pumps 18 can be stored.

FIG. 1 also illustrates a two-way communication, represented at 46.

An optional external totalizer display, operated by the flowmeter 29, is shown at 48.

In accordance with the method of this invention, it is first assumed that the liquid volume between levels 31 and 32 is known and is stored in the flowmeter 29, along with the volume pumping rate for each combination of two or more pumps. The method includes firstly allowing the liquid surface in the container 10 (for example, a wetwell) to rise between the lower limit 31 and the upper limit 30, while the pumps 18 are shut off.

The arrival of the liquid surface at the intermediate level 32 is detected and the flowmeter 29 records the time taken to rise between levels 31 and 32.

The time of arrival of the liquid surface at the upper limit level 30 is also recorded by the flowmeter 29. Upon such arrival at the upper limit level 30, the pump controller 26 selects and starts one or more pumps, including the lead pump.

The pump or pumps 18 then remain on until the liquid level falls to the lower limit level 31, whereupon the pump means is signalled to stop. The previous steps are then repeated in sequence, and the result is that the liquid level continuously moves up and down between the upper and lower limit levels.

The flowmeter 29 is adapted to calculate the on-going total inflow volume for the liquid by:

(1) if only one pump is required, calculating the inflow rate during the pumping phase by averaging the inflow rate between the intermediate and upper levels just prior to the pumping phase and the inflow rate between the lower and intermediate levels just after the pumping phase, multiplying such calculated averaged inflow rate by the duration of the pumping phase to arrive at a volume of liquid entering during the pumping phase, and adding in said volume to the totalizer; then adding in the container volume; then calculating the outflow rate (pump rate) by using the previously established average inflow rate (total volume divided by pumptime plus the average inflow rate), then storing this value in the addressable memory.

(2) or, if a plurality of pumps is required, calculating the liquid volume pumped during the pumping phase by consulting the addressable memory to determine the stored volume pumping rate for the particular plurality of pumps that is operating, multiplying such stored volume pumping rate by the duration of the pumping phase to arrive at a composite volume of liquid equalling the sum of the container volume and the liquid entering during the pumping phase, and adding in said composite volume to the totalizer.

The diagram of FIG. 2 covers approximately two complete cycles of the kind just described. Note that the container volume is added under (1) only if a single pump is required. The container volume does not need to be added under (2), because the method of calculation includes the container volume, due to the fact that the pumps not only discharge the liquid entering during the pumping phase, but also the "container volume" of liquid already in the container when the pumps are started.

In the first fill phase, the liquid level rises from level 31 to level 32 and the time lapse between the corresponding points 50 and 52 is noted. Likewise, the time lapse between points 52 and 54 is also noted, the latter representing arrival of the liquid level at the upper limit level 30. At the point 54, the pumping phase is initiated. During the pump phase, the liquid level falls from point 54 through point 56 (representing the intermediate level 32), finally arriving at point 58, representing the lower limit level. Upon arrival at the lower limit level, the pump or pumps are shut off, and the liquid is allowed to accumulate in the container 10, with the level arriving at the intermediate location represented by point 60, and subsequently arriving at the point 62, whereupon the pumping phase is again initiated.

It will be noted in FIG. 2 that the line representing the liquid level as it rises and falls has a steeper slope between the levels 32 and 30 than it has between the levels 31 and 32 (points 50, 52 and 54). This means that the inflow rate of liquid at the inlet 12 is increasing in the first fill phase represented in FIG. 2. After the ensuing pump phase is completed (points 54 to 58), the slope of the line is again slightly increased between the points 58 and 60, but then markedly decreased between 60 and 62.

In the example shown in FIG. 2, assuming only one pump is operating during the pump phase, the flowmeter 29 would average the calculated inflow rate between points 52 and 54 on the one hand, and the calculated inflow rate between points 58 and 60 on the other hand, and use the average of these two rates, along with the time during which the pump phase is "on", to calculate the total inflow during the pump phase.

It will thus be appreciated that, with a relatively simple apparatus, a considerable degree of accuracy is attained in the calculation of total accumulated flow through the container 10.

While one embodiment of this invention has been illustrated in the accompanying drawings and described hereinabove, it will be evident to those skilled in the art that changes and modifications may be made therein without departing from the present invention, as set forth in the appended claims.

The embodiments of the invention in which an exclusive property or privilege is claimed are defined as follows:

1. A method for determining the total flow of a liquid through a liquid-flow system in which the liquid enters a container and is pumped out of the container by pump means which includes at least two pumps that may operate independently or together, the volume pumping rate for at least each combination of pumps being known and stored in an addressable memory, the method comprising the steps:

(a) allowing the liquid surface in the container to rise between a predetermined lower limit level and a predetermined upper limit level while the pump means is shut off, (b) detecting the arrival of the liquid surface at a predetermined intermediate level as it rises between the lower limit level and the upper limit level, the liquid volume between the lower and the intermediate levels being substantially the same as the liquid volume between the intermediate and the upper levels, (c) detecting the arrival of the liquid surface at the upper limit level, and upon such arrival, signalling the pump means to begin the pumping phase utilizing one or more pumps sufficient to remove liquid from the container faster than the inflow rate, (d) detecting the arrival of the liquid surface at the lower limit level, and upon such arrival, signalling the pump means to stop the pumping phase, (e) again allowing the liquid surface to rise as in step (a) and repeating steps (b), (c) and (d) in sequence, and (f) calculating an on-going total inflow volume for the liquid by:

(1) if only one pump is required under (c), calculating the inflow rate during the pumping phase by averaging the inflow rate between the intermediate and upper levels just prior to the pumping phase and the inflow rate between the lower and intermediate levels just after the pumping phase, multiplying such calculated averaged inflow rate by the duration of the pumping phase to arrive at a volume of liquid entering during the pumping phase, and adding in said volume; then adding the container volume; then calculating the outflow rate (pump rate) by using the previously established average inflow rate (total volume divided by pumptime plus the average inflow rate), then storing this value in the addressable memory, (2) or, if a plurality of pumps is required under (c), calculating the liquid volume pumped during the pumping phase by consulting said addressable memory to determine the stored volume pumping rate for the particular plurality of pumps that is operating, multiplying such stored volume pumping rate by the duration of the pumping phase to arrive at a composite volume of liquid equalling the sum of the container volume and the liquid entering during the pumping phase, and adding in said composite volume.

2. The method claimed in claim 1, in which the detection of the arrival of the liquid surface at the various levels is accomplished using float switches.

3. The method claimed in claim 1, in which the detection of the arrival of the liquid surface at the various levels is accomplished using ultrasonic detection means.

4. The method claimed in claim 1, in which the step of calculating under (f) utilizes a totalizing means incorporated into a computing device.

5. Apparatus for determining the total flow of a liquid through a liquid-flow system which includes a container for receiving the liquid and pumping means by which the liquid is pumped out of the container during a pumping phase, the pumping means including at least two pumps and a control means adapted to operate the pumps independently or together, and an addressable memory in which the volume pumping rate for at least each combination of pumps is stored, the apparatus comprising:

(a) first means for detecting the arrival of the liquid surface at a predetermined lower limit level as it drops during a pumping phase, and for generating a signal which turns off said pumping means, (b) second means for detecting the arrival of the liquid surface at a predetermined intermediate level as it rises from the lower limit level, while the pumping means is off, (c) third means for detecting the arrival of the liquid surface at an upper limit level and for generating a signal which turns on said pumping means utilizing at least one pump sufficient to remove liquid from the container faster than the inflow rate, the liquid volume between the lower and the intermediate levels being substantially the same as the liquid volume between the intermediate and the upper levels, whereby the liquid surface continuously rises and falls between said upper and lower limit levels, and (d) computing means for calculating an on-going total inflow volume for the liquid by:

(1) if only one pump is required under (c), calculating the inflow rate during the pumping phase by averaging the inflow rate between the intermediate and upper levels just prior to the pumping phase and the inflow rate between the lower and intermediate levels just after the pumping phase, multiplying such calculated averaged inflow rate by the duration of the pumping phase to arrive at the volume of liquid entering during the pumping phase, and adding in the latter volume; then adding in the container volume; then calculating the outflow rate (pump rate) by using the previously established average inflow rate (total volume divide by pumptime plus the average inflow rate), then storing this value in the addressable memory, (2) or, if a plurality of pumps is required under (c), calculating the liquid volume pumped during the pumping phase by consulting said addressable memory to determine the stored volume pumping rate for the particular plurality of pumps that is operating, multiplying such stored volume pumping rate by the duration of the pumping phase to arrive at a composite volume of liquid equalling the sum of the container volume and the liquid entering during the pumping phase, and adding in said composite volume.

6. The apparatus claimed in claim 5, further comprising float switches to detect the arrival of the liquid surface at the various levels.

7. The apparatus claimed in claim 5, further comprising ultrasonic detection means to detect the arrival of the liquid surface at the various levels.

* * * * *